3,294,739
METHOD OF MAKING ONE COMPONENT ROOM TEMPERATURE CURING SILOXANE RUBBERS
Donald R. Weyenberg, Midland, Mich., assignor to Dow Corning Corporation, Midland, Mich., a corporation of Michigan
No Drawing. Filed Nov. 19, 1964, Ser. No. 412,312
18 Claims. (Cl. 260—46.5)

This application is a continuation-in-part of applicant's copending application Serial No. 195,381, filed May 17, 1962, now abandoned, entitled, "Method of Making One Component Room Temperature Curing Siloxane Rubbers," which is in turn a continuation-in-part of applicant's application Serial No. 145,443, filed October 16, 1961, now abandoned.

This invention relates to organosiloxytitanium-catalyzed one-component room temperature curing siloxane rubbers.

It is known from U.S. Patent 2,843,555, that a hydroxyl endblocked polysiloxane can be mixed with alkylsilicates and with alkyltitanates whereupon the mixture spontaneously cures to a rubber. However, as taught in this patent, the curing spontaneously takes place upon mixing the three ingredients and is complete within from 15 minutes to 2 days. Thus, the material must be used soon after the catalyst, silicate and siloxane are mixed.

This type of silicone rubber is known as a two component system because in commercial operation, one must supply the customer with two packages, one of which would contain the catalyst and the other a mixture of silicate and siloxane. The user would then proceed to mix these two components when he desired to use the product. Such a two component system is one of many which are known in the siloxane art. In general, they comprise a polymer, a crosslinker and a catalyst and the three components are always mixed just prior to use and the use of the material must be complete prior to gelation. Once gelation has occurred, it is no longer possible to employ the rubber to fabricate useable articles or to impregnate porous materials.

Obviously, such two component systems, although commercially feasible in many cases, are subject to serious limitations. One of these is the fact that the material must be used shortly after mixing. The second is that if for any reason one cannot employ a material shortly after mixing, the whole batch can be lost. Consequently, it would be highly advantageous to have a system which does not require any mixing by the user prior to use and which can be kept in a useable form indefinitely after all the ingredients have been mixed.

It is the object of this invention to provide a one-component room temperature curing siloxane elastomer system which can be stored for prolonged periods of time and yet which will cure spontaneously upon exposure to atmospheric moisture. Another object is to provide a material which is useable as a sealant, an electrical insulation material and as a coating composition. Another object is to provide a material which can be produced without passing through a thixotropic stage in which very high shear is required to mix the ingredients and wherein a viscous material results. Other objects and advantages will be apparent from the following description.

In accordance with this invention, a siloxane rubber composition is prepared by mixing in the absence of moisture (1) a siloxane having a viscosity of at least 25 cs. at 25° C. and being of the average formula

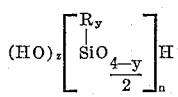

in which $z$ has an average value from 1 to 1.01 inclusive, $y$ has an average value from 1.99 to 2 inclusive, the sum of $z+y$ being 3, R is a monovalent radical of less than 19 carbon atoms selected from the group consisting of hydrocarbon radicals, halohydrocarbon radicals and cyanoalkyl radicals, (2) a silane of the formula $$R'_xSi(OR'')_{4-x}$$

in which R' is a monovalent radical of less than 19 carbon atoms selected from the group consisting of hydrocarbon radicals, halohydrocarbon radicals and cyanoalkyl radicals, R'' is a monovalent radical of less than 5 carbon atoms selected from the group consisting of haloaliphatic hydrocarbon radicals having no halogen alpha to the oxygen and aliphatic hydrocarbon radicals, and $x$ has an average value from 0 to 1, (2) being present in an amount such that there is at least 0.5 mol of silane per mol of a silicon-bonded hydroxyl in (1), and (3) at least 0.1 percent by weight based on the weight of (1) of a titanium compound having radicals attached to the titanium atom, at least one of said radicals being an organosiloxy radical bonded to the titanium atom through Ti-O-Si linkages wherein each silicon-bonded organic substituent is a monovalent radical selected from the group consisting of hydrocarbon and halohydrocarbon radicals, any remaining valences of the titanium atom being satisfied by substituents selected from the group consisting of organic radicals which are attached to the titanium atom through Ti-O-C linkages, —OH, and oxygen atoms present as Ti-O-Ti linkages.

The term "in the absence of moisture" as used above, includes both liquid water and water vapor including atmospheric moisture.

It has been found that when the above three ingredients are mixed in the absence of water, that an interaction takes place at room temperature or above to produce a material which is stable in the absence of moisture and can be stored for prolonged periods of time. However, this material will cure spontaneously upon exposure to moisture, including atmospheric moisture, in a matter of a few minutes to a few hours to give a rubbery material. The nature of the product formed by mixing the three ingredients in the absence of moisture is not precisely known. However, it is believed that the alkoxyl groups on the silane react with the hydroxyl groups of the hydroxylated siloxane to produce siloxanes of the structure

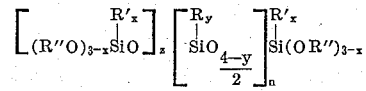

with the elimination of an alcohol, R''OH. It should be understood, however, that applicant is not limiting this invention to the production of this particular type of structure, but it is entirely possible that far more complicated structures are produced and that other mechanisms may be involved.

When an organotitanium compound and the hydroxylated siloxane are first mixed, there is a substantial increase in viscosity of the mixture. This viscosity rise is small when an organosiloxytitanium compound is employed and even non-existent in some compositions. The viscosity rise is minimized when an organosiloxytitanium compound which has one or more chelating groups attached to the titanium atoms is used, e.g.

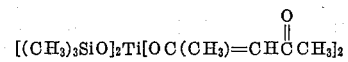

Also little or no viscosity increase is obtained when an organosiloxytitanium compound is used in place of an organotitanium compound in a mixture of hydroxylated siloxane and silane. A substantial increase in viscosity of the mixture is obtained when organotitanium compounds are used and especially when the silane is Si(OR")$_4$. Such high viscosities require very high shear for mixing the ingredients and thus, unnecessary delays are encountered. Additional stirring time and delays are not economical and therefore the organosiloxytitanium compounds of the present invention are used. The organosiloxytitanium compounds when mixed with the hydroxylated siloxane and silane do not produce a thixotropic mixture, nor is there a large increase in viscosity. The products are equivalent to those not containing the organosiloxytitanium. The organosiloxytitanium compounds are thus superior to the organotitanium compounds. The most preferred organosiloxytitanium compounds are those containing one or more chelating groups.

The order of addition of the components of the compositions of this invention is not critical. Thus, one can first mix the siloxane with the silane and thereafter incorporate the organosiloxytitanium compound or one can mix the siloxane with the organosiloxytitanium compound, and thereafter incorporate the silane or one may mix the organosiloxytitanium compound with the silane and thereafter incorporate the siloxane or one can simultaneously mix all three ingredients.

In carrying out the reaction of this invention, there should be at least 0.5 mol of silane (2) per mol of hydroxyl groups in (1). The upper limit of the amount of silane employed is not critical. However, obviously, grossly excessive amounts of silane will merely dilute out the composition. Preferably, the amount of silane employed is in excess of one mol of silane per mol of silicon-bonded hydroxyl in order to protect the system from gelation due to the incidental presence of water which may be carried into the system by way of other ingredients such as fillers or stabilizing additives or which may diffuse into the system during storage.

In order to obtain a reasonable cure time upon exposure to moisture, there should be at least 0.1 percent by weight of the organosiloxytitanium compound based on the weight of (1). The upper limit of the amount of organosiloxytitanium compound is not critical, although generally speaking, there is no advantage in employing more than 10 percent by weight organosiloxytitanium compound.

For the purpose of this invention, the ingredients can be mixed at any desired temperature ranging from below room temperature up to above 200° C. Ordinarily, satisfactory results are obtained by mixing the ingredients at room temperature, but often it is desirable to heat the mixture at temperatures above the volatilization point of the by-produced alcohol. It is also advantageous, but not essential, to remove the by-produced alcohol from the mixture prior to storage.

The hydroxylated siloxanes employed herein can be prepared by any of the conventional methods for preparing hydroxylated siloxanes. One such method is described in U.S. Patent No. 2,779,776. The viscosity of the hydroxylated siloxane should be at least 25 cs. at 25° C. but there is no critical upper limit to the viscosity. Thus, for example, the hydroxylated siloxane can vary from thin fluids to nonflowable gums. The particular viscosity selected will depend upon the use to which the composition is to be put. For maximum impregnation of porous materials, a low viscosity is desired. However, for maximum tensile strength and elongation in the cured rubber, gums are desired. Operable siloxane polymers are described in U.S. patents such as No. 2,843,555, No. 3,127,363 and No. 3,035,016.

For the purpose of this invention, the silicon of the siloxane can be substituted with any monovalent hydrocarbon radical such as alkyl radicals, such as methyl, ethyl, propyl, hexyl or octadecyl; alkenyl radicals, such as vinyl, allyl, hexenyl and methallyl; cycloaliphatic hydrocarbon radicals, such as cyclopentyl, cyclohexyl and methylcyclohexyl; aralkyl hydrocarbon radicals, such as benzyl, β-phenylethyl and β-phenylpropyl; and aryl hydrocarbon radicals such as phenyl, xenyl, tolyl, xylyl or naphthyl. R can also be any halogenated monovalent hydrocarbon radical, such as chloromethyl, β-chloropropyl, 3,3,3-trifluoropropyl, α,α,α-trifluorotolyl, chlorophenyl, bromoxenyl, trifluorovinyl or chlorocyclohexyl. R can also be any cyanoalkyl radical, such as β-cyanoethyl, β-cyanopropyl, gamma-cyanopropyl or omega-cyanooctadecyl.

For the purpose of this invention the hydroxylated siloxane can be either a homopolymer or a copolymer and the various R groups attached to any one silicon atom can be the same or different. As can be seen from the formula, the siloxane can be linear in structure or it can be branched in structure depending upon the value of y.

For the purpose of this invention, R' can be any of the radicals shown above for R. In the silanes employed herein, R" can be any aliphatic hydrocarbon radical of less than 5 carbon atoms, such as methyl, ethyl, propyl or butyl, or any aliphatic halohydrocarbon radical of less than 5 carbon atoms such as β-chloroethyl, delta-chlorobutyl, —CH$_2$C$_2$F$_5$, β-bromopropyl, 3-iodobutyl and 2,2,2-trifluoroethyl. Thus, specific examples of silanes which can be used are tetraethoxysilane, ethyltrimethoxysilane, vinyltrimethoxysilane, 3,3,3 - trifluoropropyltrimethoxysilane, β-cyanoethyltrimethoxysilane, tetraisopropoxysilane, tetrabutoxysilane, phenyltrimethoxysilane, octadecyltrimethoxysilane, tetra-(β-chloroethoxy)silane, tetra-(2,2,2-trifluoroethoxy)silane, and propyl-tris(delta-chlorobutoxy)silane. Other operable silanes are described in the art in such U.S. patents as No. 2,843,555, No. 3,127,363 and No. 2,927,907.

Organosiloxytitanium compounds in which the organosiloxy radical is attached to the titanium atom through Si-O-Ti linkages are employed in this invention. Each organic radical in the organosiloxy radical can be either a monovalent hydrocarbon or monovalent halohydrocarbon radical. Suitable examples of such radicals have been set forth above for R. Any valences of the titanium atom in the organosiloxytitanium compound which are not satisfied by organosiloxy radicals are satisfied by organic radicals which are attached to the titanium atom through Ti-O-C linkages, hydroxyl radicals and oxygen atoms of a Ti-O-Ti linkage. Thus, the two main classes of organosiloxytitanium compounds which fall within the above definition are those containing four organosiloxy radicals per titanium atom and those which contain from one to three organosiloxy radicals per titanium atom with the remaining valences of the titanium atom being satisfied by organic radicals, hydroxyl radicals and oxygen atoms of Ti-O-Ti linkages. An example of the first class of organosiloxytitanium compound is [(CH$_3$)$_3$SiO]$_4$Ti. In the second class of organosiloxytitanium compounds, the remaining valences of the titanium can be satisfied by organic radicals, e.g.

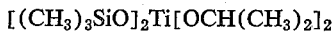

and

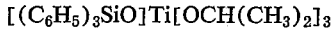

or hydroxyl radicals, e.g. [(CH$_3$)$_2$(C$_6$H$_5$)SiO]$_3$Ti(OH); or oxygen atoms of a Ti-O-Ti linkage, e.g. organosiloxytitanium polymers of the unit formula OTi[OSi(CH$_3$)$_3$]$_2$. The valences in this second type of organosiloxytitanium compound can also be satisfied by a mixture of the above substituents, e.g.

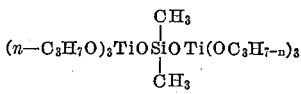

The organosiloxytitanium compounds which contain only organosiloxy radicals and alkyl radicals attached to the titanium atom through Ti-O-C linkages can be prepared by the reaction of an acyloxysilane and a titanium ortho ester in accordance with the following equation:

(A) $b(Y_3SiOAc) + Ti(OY')_4 \rightarrow$
$(Y_3SiO)_bTi(OY')_{4-b} + b(Y'OAc)$

Y is either a monovalent hydrocarbon or monovalent halohydrocarbon radical as defined above for R. Ac is an acyl radical, such as

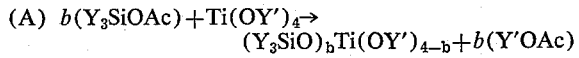

Y' is an alkyl radical. The subscript $b$ is an integer from 1 to 4 inclusive. Organosiloxytitanium compounds containing from 1 to 4 organosiloxy radicals attached to a single titanium atom can be prepared in this manner by merely controlling the stoichiometry of the reaction, the particular reactants used and their order of addition. In general, this reaction occurs merely upon heating the reactants. This type of reaction is described in detail in an article of Rust et al. in 25 J. of Org. Chem. 2040 (1960) and in Canadian Patent No. 545,395 (Gilkey), both of which are hereby incorporated by reference. Alternatively, this type of organosiloxytitanium compound can be prepared by using a silanol in place of the acyloxy silane. Organosiloxytitanium compounds, in which each organosiloxy radical is a siloxane chain containing two or more

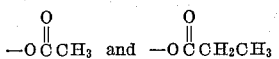

units, can be prepared by substituting a hydroxyl-containing siloxane for the silanol. When a titanium ortho ester and a silanol or hydroxyl-containing siloxane are used as reactants, the titanium ortho ester can contain from 1 to 3 chelating groups (e.g.

These chelating groups are not generally replaced by organosiloxy radicals during the reaction.

Those organosiloxytitanium compounds which contain only organosiloxy and organic radicals bonded to the titanium atom through Ti-O-C linkages can also be prepared by the reaction of a silanol and a titanium chloride.

When the organosiloxytitanium compound contains one or more alkoxy radicals linked to the titanium atom through Ti-O-C linkages, these alkoxy groups can be replaced with chelating groups such as β-dihydroxy or β-diketone derivatives. This replacement occurs during the reaction of the organosiloxyalkoxytitanium compound and the appropriate β-diketone or β-dihydroxy compound. An illustrative reaction of this type is the reaction of acetylacetone and an isopropoxytrimethylsiloxytitanium compound as follows:

(B)
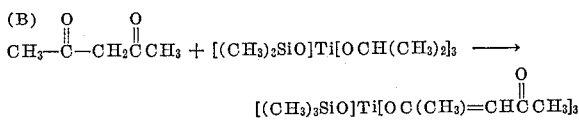

It is generally only necessary to mix and heat the reactants to effect this reaction. This reaction is described in detail by Takimoto et al. in 26 J. of Org. Chem. 2467 (1961).

Organosiloxytitanium compounds having two or more titanium atoms attached to each other through Ti-O-Si-O-Ti linkages can be prepared by the reaction of a dialkoxy-titanium oxide and an alkoxy silane. An illustrative reaction of this type is the reaction of dipropoxytitanium oxide and dimethyldipropoxysilane as follows:

(C)
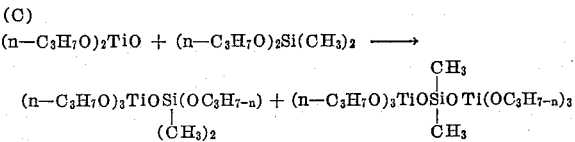

This reaction is described in detail by Nemeyanov in Bull. of Acad. of Sci. (U.S.S.R), Div. of Chem. Sci., 1960 (Eng. Trans.) p. 1117.

The organosiloxytitanium compounds which have four organosiloxy radicals attached to a single titanium atom can be hydrolyzed to form organosiloxytitanium polymers. Illustrative of such hydrolysis is the following reaction:

(D) $[(CH_3)_3SiO]_4Ti + H_2O \rightarrow OTi[OSi(CH_3)_3]_2$

This hydrolysis is described in detail by Andrianov et al., Proc. of Acad. of Sci. (U.S.S.R.), (Eng. Trans.) 147 (6), 1957. Specific examples of organosiloxytitanium compounds which are operative herein include:

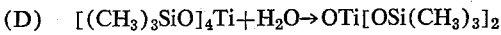

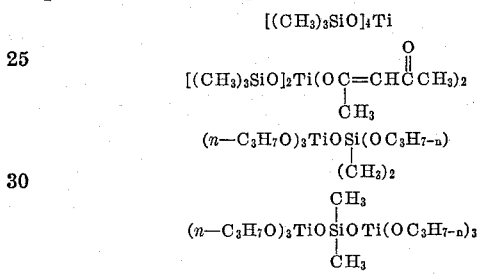

A polymer of the unit formula $OTi[OSi(CH_3)_3]_2$,

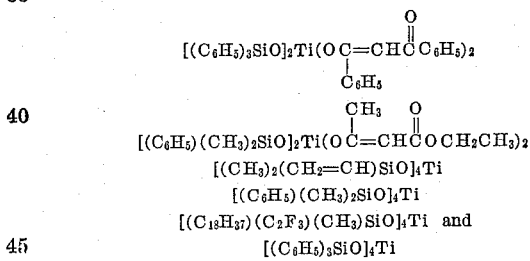

Although one component room temperature curing siloxane rubbers are obtained when organotitanium compounds are used, the best results are obtained with the organosiloxytitanium compounds. The preferred organosiloxytitanium compounds are those in which the organic radical bonded to the silicon atom of the organosiloxy radicals is a monovalent hydrocarbon radical and any remaining valences of the titanium atom are satisfied by organic radicals which are attached to the titanium atom through Ti-O-C linkages. Preferably the organic radical in the organosiloxy radical is methyl. The best results are obtained with organosiloxytitanium compounds which have at least one organosiloxy radical and any remaining valences of the titanium atom are satisfied by chelating groups which are attached to the titanium atom through Ti-O-C linkages. Suitable examples of such chelating groups are

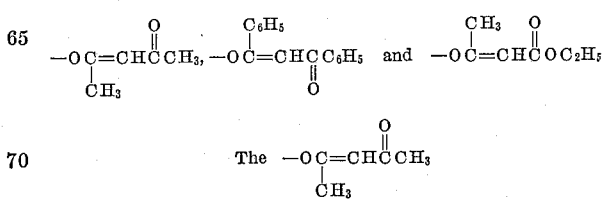

The
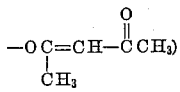

group is preferred. The organosiloxytitanium compounds containing such chelating groups are preferred because there is very little viscosity rise when the hydroxylated siloxane and this type of organosiloxytitanium compound are mixed.

If desired, the process of this invention can include mixing other ingredients with the essential ingredients shown above. These added ingredients can include fillers which will impart desirable stress-strain properties to the resulting rubbers. Any filler normally employed in siloxane rubbers can be used in the compositions of this invention. These include organic fillers such as phthalocyanine or copper phthalocyanine and inorganic fillers such as metal oxides such as alumina, titania, zirconia, magnesia and zinc oxide; siliceous materials such as aluminum silicate, mica and glass; silica such as diatomaceous earth, fume silica, sand, crushed quartz, silica xerogels and precipitated silicas and carbon such as carbon black or graphite. If desired, the fillers employed herein can contain organosilyl groups attached to the surface thereof. These fillers are well-known articles of commerce.

In addition, the compositions of this invention may include plasticizers employed to lower the durometer of the cured rubber. Suitable plasticizers include trimethylsiloxy-endblocked dimethylpolysiloxane fluids. In addition, the compositions of this invention may contain other ingredients to improve specific properties of the rubbers such as compression set additives, oxidation inhibitors, ultraviolet absorbers and the like.

The compositions of this invention can also be used with organic solvents. The composition is mixed with an essentially water-free organic solvent, such as toluene, xylene, diethyl ether, butyl acetate, cyclohexane, dibutyl ether, methylbutyl ketone, naphtha, mineral spirits, benzene, chlorothene, perchloroethylene, trichloromonofluoromethane, monochlorotrifluoromethane, tetrafluoromethane, trichlorotrifluoroethane, trifluoromethane, dichlorodifluoromethane, chlorobenzene and other conventional solvents, and mixtures of solvents for organosilicon compounds. These organic solvent solutions of the composition of this invention must be mixed and stored under conditions which essentially provide no moisture contact. The solvent solution can be used to provide an elastomeric film which cures upon exposure to moisture. Such solvent solution can be applied by spraying, brushing, dipping or from an aerosol container.

The above added ingredients can be added to the compositions of this invention at any time, but care should be taken not to introduce appreciable amounts of moisture along with the added ingredients. The compositions of this invention, with or without the added ingredients, cure spontaneously upon exposure to moisture to give rubbery products. However, they can be stored in the absence of moisture for prolonged periods of time and thus they are highly useful in calking applications, in coating applications and in the insulation of electrical equipment. Storage of the compositions of this invention are best accomplished by keeping the prepared compositions in sealed fluid tight containers.

The following examples are illustrative only and should not be construed as limiting the invention which is properly set forth in the appended claims.

*Example 1*

20 g. of a 2,000 cs. hydroxyl-endblocked dimethylpolysiloxane fluid was mixed in a container in the absence of moisture with about 0.2 g. of

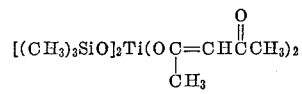

After mixing the above ingredients, there was no viscosity change upon stirring the mixture. This material was mixed with 1 cc. of vinyltrimethoxysilane. This composition was stable upon storage in the absence of moisture, but cured rapidly upon exposure to the atmosphere.

*Example 2*

20 g. of a 2,000 cs. hydroxyl-endblocked dimethylpolysiloxane fluid was mixed in the absence of moisture with .35 g. of [(CH$_3$)$_3$SiO]$_4$Ti and 1 g. of vinyltrimethoxysilane. A very slight viscosity rise occurred upon mixing the ingredients, but no further change in viscosity was noted upon storage in the absence of moisture. This composition cured rapidly upon exposure to atmospheric moisture.

*Example 3*

When the following siloxanes, silanes and organosiloxytitanium compounds are mixed in the absence of moisture in amount so that there is at least 0.5 mol of silane per mol of SiOH in the siloxane and at least 0.1 percent by weight organosiloxytitanium compound based on the weight of the siloxane, the resulting products are stable in the absence of moisture, but will cure upon exposure to moisture to give a rubber.

TABLE

| | Siloxane | Silane | Organosiloxytitanium Compound |
|---|---|---|---|
| 1 | HO[SiO(C$_2$H$_3$)(Me)]$_{100}$H | C$_2$H$_3$Si(OMe)$_3$ | [(CH$_3$)$_3$SiO]$_2$Ti[OCH(CH$_3$)$_2$]$_2$ |
| 2 | HO[Si(C$_6$H$_4$Cl)(Me)O]$_{25}$H | C$_6$H$_{11}$Si(OMe)$_3$ | (n-C$_3$H$_7$O)$_3$TiOSi(OC$_3$H$_{7-n}$)(CH$_3$)$_2$ |
| 3 | HO[(SiO)(CH$_2$CH(CH$_3$)C$_6$H$_5$)(Me)–(SiO)(C$_2$H$_5$)(Me)]$_{100}$H | C$_2$H$_3$Si(OC$_3$H$_7$)$_3$ | [(CH$_3$)$_3$SiO]$_4$Ti |

TABLE I—Continued

| | Siloxane | Silane | Organosiloxytitanium Compound |
|---|---|---|---|
| 4 | $\mathrm{Si}\left[\text{(cyclohexyl)}\overset{Me}{\underset{Me}{|}}(OSi)_{20}OH\right]_3$ | $Si(OC_2H_5)_4$ | $[(CH_3)_3SiO]Ti(O\underset{CH_3}{\overset{O}{\underset{|}{C}=CH\overset{\|}{C}CH_3}})_3$ |
| 5 | $\mathrm{Si}\left[\overset{C_2H_5}{\underset{Me}{|}}O(SiO)_{20}H\right]_4$ | $C_6H_5Si(OMe)_3$ | $(n\text{-}C_3H_7O)_3TiOSiOTi(OC_3H_{7-n})_3$ with $CH_3$ groups on central Si |
| 6 | $HO\left[\overset{CH_2CH_2CN}{\underset{Me}{\underset{|}{SiO}}}\right]_{20}H$ | $(MeO)_4Si$ | $[(C_6H_5)_3SiO]Ti[OCH(CH_3)_2]_3$ |
| 7 | $HO\left[\overset{C_{18}H_{37}}{\underset{Me}{\underset{|}{(SiO)}}}\overset{Me_2}{(SiO)_6}\right]_{100}H$ | $Si(OC_3H_7)_4$ | $[(CH_3)_2(C_6H_5)SiO]_3TiOH$ |
| 8 | $HO\left[\overset{Me_2}{\underset{|}{SiO}}\right]_{1000}H$ | $MeSi(OMe)_3$ | $[(C_6H_5)_3SiO]_4Ti$ |
| 9 | $HO\left[\overset{Me_2}{\underset{|}{SiO}}\right]_{100}H$ | $C_{18}H_{37}Si(O\overset{Me}{\underset{|}{CH}}CH_2Cl)_3$ | $[(C_6H_5)(CH_3)_2SiO]_2Ti(O\overset{CH_3}{\underset{|}{C}}=CH\overset{O}{\overset{\|}{C}}OCH_2CH_3)_2$ |
| 10 | $HO\left[\overset{Me_2}{\underset{|}{SiO}}\right]_{200}H$ | $Si[O(CH_2)_4Br]_4$ | A polymer of the unit formula: $OTi[OSi(CH_3)_3]_2$ |
| 11 | $HO\left[\overset{Me_2}{\underset{|}{SiO}}\right]_{5000}H$ | $MeSi(OMe)_3$ | $[(CH_3)_2(CH_2=CH)SiO]_4Ti$ |
| 12 | $HO\left[\overset{Me_2}{\underset{|}{SiO}}\right]_{200}H$ | $Si[OCH_2C_2F_5]_4$ | $[(CH_3)_3SiO]Ti[OC(CH_3)=CH\overset{O}{\overset{\|}{C}}CH_3]_3$ |
| 13 | $HO\left[\overset{CH_2CH_2CH_2Cl}{\underset{Me}{\underset{|}{SiO}}}\right]_{100}H$ | $MeSi(OMe)_3$ | $[(C_6H_5)_3SiO]_2Ti(O\overset{O}{\underset{C_6H_5}{\underset{|}{C}=CH\overset{\|}{C}C_6H_5}})_2$ |
| 14 | $HO\left[\text{(cyclohexyl-}Br_4)\overset{|}{\underset{Me}{\underset{|}{SiO}}}\right]_{30}H$ | $MeSi(OMe)_3$ | $[(CH_3CH_2)_3SiO]_3TiO\overset{C_6H_5}{\underset{\|O}{\underset{|}{C}=CH\overset{}{C}C_6H_5}}$ |
| 15 | $HO\left[\overset{Me_2}{\underset{|}{SiO}}\right]_{1000}H$ | $(CF_3CH_2O)_4Si$ | $[(C_6H_5)(CH_3)_2SiO]_4Ti$ |
| 16 | $HO\left[\overset{Me_2}{\underset{|}{SiO}}\right]_{100}H$ | $MeSi(OCH_2CH_2Cl)_3$ | $[(C_{18}H_{37})(C_2F_3)(CH_3)SiO]_4Ti$ |

*Example 4*

When each of the products of Example 3 are placed in sealed fluid tight containers, they can be stored indefinitely, but when exposed to atmospheric moisture the products will cure to elastomeric products.

That which is claimed is:

1. A method of preparing a composition which is stable in the absence of moisture, but which will cure upon exposure to moisture which comprises mixing in the absence of moisture (1) a hydroxylated siloxane having a viscosity of at least 25 cs. at 25° C. and having the average formula

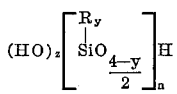

in which $z$ has an average value from 1 to 1.01 inclusive, $y$ has an average value from 1.99 to 2 inclusive, and the sum of $y+z$ is 3, R is a monovalent radical having less than 19 carbon atoms selected from the group consisting of hydrocarbon radicals, halogenated hydrocarbon radicals and cyanoalkyl radicals, and $n$ is an integer.

(2) a silane of the formula $R'_xSi(OR'')_{4-x}$ in which R' is a monovalent radical having less than 19 carbon atoms selected from the group consisting of hydrocarbon radicals, halohydrocarbon radicals and cyanoalkyl radicals, R'' is a monovalent radical having less than 5 carbon atoms selected from the group consisting of haloaliphatic hydrocarbon radicals having no halogen atoms alpha to the oxygen atom and aliphatic hydrocarbon radicals, and $x$ has an average value from 0 to 1 inclusive, (2) being present in an amount of at least 0.5 mol of silane per mol of silicon-bonded hydroxyl in (1), and (3) at least 0.1 percent by weight, based on the weight of (1) of a titanium compound having radicals attached to the titanium atom, at least one of said radicals being an organosiloxy radical wherein each silicon-bonded organic radical is a monovalent radical selected from the group consisting of hydrocarbon radicals, and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage.

2. The method in accordance with claim 1, in which the mixture is thereafter heated to remove by-produced alcohol.

3. The method in accordance with claim 1 in which (4) a filler is included in the mixture.

4. The method in accordance with claim 1 in which $x$ is 1.

5. A method of preparing a composition which is stable in the absence of moisture but which will cure upon exposure to moisture which comprises mixing in the absence of moisture (1) a hydroxylated siloxane having a viscosity of at least 25 cs. at 25° C. of the formula

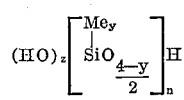

in which $z$ has an average value from 1 to 1.01 inclusive, $y$ has an average value from 1.99 to 2 inclusive, the sum of $z+y$ being 3, Me is a methyl radical and $n$ is an integer, (2) methyltrimethoxysilane in an amount of at least 0.5 mol of silane per mol of silicon-bonded hydroxyl radical in (1) and (3) at least 0.1 percent by weight based on the weight of (1) of a titanium compound having organosiloxy radicals attached to the titanium atom through Ti-O-Si linkages, wherein each organic radical is a monovalent hydrocarbon radical and any remaining valences of the titanium atom are satisfied by organic radicals which are attached to the titanium atom through Ti-O-C linkages.

6. The method in accordance with claim 5 wherein the organosiloxy radical is —OSi(CH₃)₃ and any organic radicals which are attached to the titanium atom are of the formula

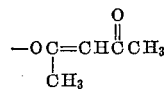

7. The method in accordance with claim 5 in which (4) a filler is included in the mixture.

8. A method of preparing a rubbery material which comprises mixing in the absence of moisture (1) a hydroxylated siloxane having a viscosity of at least 25 cs. at 25° C. and being of the average formula

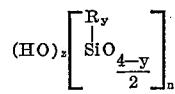

in which $z$ has an average value from 1 to 1.01 inclusive, $y$ has an average value from 1.99 to 2 inclusive and the sum of $y+z$ is 3, R is a monovalent radical of less than 19 carbon atoms selected from the group consisting of hydrocarbon radicals, halogenated hydrocarbon radicals and cyanoalkyl radicals, and $n$ is an integer, (2) a silane of the formula $R'_xSi(OR'')_{4-x}$ in which R' is a monovalent radical of less than 19 carbon atoms, selected from the group consisting of hydrocarbon radicals, halohydrocarbon radicals and cyanoalkyl radicals, R'' is a monovalent radical of less than 5 carbon atoms selected from the group consisting of haloaliphatic hydrocarbon radicals having no halogen atoms alpha to the oxygen atom, and aliphatic hydrocarbon radicals, and $x$ has an average value from 0 to 1 inclusive, (2) being present in an amount of at least 0.5 mol of silane per mol of silicon-bonded hydroxyl in (1), and (3) at least 0.1 percent by weight based on the weight of (1) of a titanium compound having radicals attached to the titanium atom, at least one of said radicals being an organosiloxy radical wherein each organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage and thereafter exposing the mixture to moisture whereby it cures to a rubbery material.

9. A method in accordance with claim 8 wherein R, R' and R'' are methyl radicals and the titanium compound has at least one organosiloxy radical of the formula OSi(CH₃)₃ attached to the titanium atom through Ti-O-Si linkages and any remaining valences of the titanium atom being satisfied by radicals of the formula

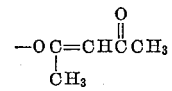

which are attached to the titanium atom through Ti-O-C linkages.

10. A method in accordance with claim 8 in which (4) a filler is included in the mixture.

11. The method in accordance with claim 8 wherein $x$ is 1.

12. A method of preparing a composition which is stable in the absence of moisture but which will cure upon exposure to moisture which comprises mixing in the absence of moisture (1) a hydroxylated siloxane having a viscosity of at least 25 cs. at 25° C. of the formula

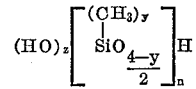

in which $z$ has an average value from 1 to 1.01 inclusive, $y$ has an average value from 1.99 to 2 inclusive, the sum of $z+y$ being 3, and $n$ is an integer, (2) vinyltrimethoxysilane in an amount of at least 0.5 mol of silane per mol of silicon-bonded hydroxyl radical in (1), and (3) at least 0.1 percent by weight based on the weight of (1) of

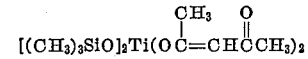

13. A method of preparing a composition which is stable in the absence of moisture but which will cure upon exposure to moisture which comprises mixing in the absence of moisture (1) a hydroxylated siloxane having a viscosity of at least 25 cs. at 25° C. of the formula

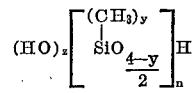

in which $z$ has an average value from 1 to 1.01 inclusive, $y$ has an average value from 1.99 to 2 inclusive, the sum of $z+y$ being 3, and $n$ is an integer, (2) vinyltrimethoxysiloxane in an amount of at least 0.5 mol of silane per mol of silicon-bonded hydroxyl radical in (1), and (3) at least 0.1 percent by weight based on the weight of (1) of [(CH$_3$)$_3$SiO]$_4$Ti.

14. A composition of matter, stable under anhydrous conditions and curable by exposure to moisture, being mixed in the absence of moisture comprising (1) a hydroxylated siloxane having a viscosity of at least 25 cs. at 25° C. and having the average formula

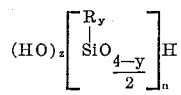

in which $z$ has an average value from 1 to 1.01 inclusive, $y$ has an average value from 1.99 to 2 inclusive and the sum of $y+z$ is 3, R is a monovalent radical having less than 19 carbon atoms selected from the group consisting of hydrocarbon radicals, halogenated hydrocarbon radicals and cyanoalkyl radicals and $n$ is an integer, (2) a silane of the formula R'$_x$Si(OR'')$_{4-x}$ in which R' is a monovalent radical having less than 19 carbon atoms selected from the group consisting of hydrocarbon radicals, halohydrocarbon radicals and cyanoalkyl radicals, R'' is a monovalent radical having less than 5 carbon atoms selected from the group consisting of haloaliphatic hydrocarbon radicals having no halogen atoms alpha to the oxygen atom and aliphatic hydrocarbon radicals, and $x$ has an average value from 0 to 1 inclusive, (2) being present in an amount of at least 0.5 mol of silane per mol of silicon-bonded hydroxyl in (1), and (3) at least 0.1 percent by weight, based on the weight of (1) of a titanium compound having radicals attached to the titanium atoms, at least one of said radicals being an organosiloxy radical wherein each silicon-bonded organic radical is a monovalent radical selected from the group consisting of hydrocarbon radicals and halohydrocarbon radicals, said organosiloxy radicals being attached to the titanium atom through Ti-O-Si linkages and any remaining valences of the Ti are satisfied by substituents selected from the group consisting of organic radicals which are attached to the titanium atom through Ti-O-C linkages, —OH and —O— of a Ti-O-Ti linkage.

15. A composition of matter according to claim 14 wherein $x$ is 1.

16. The composition of matter of claim 14 wherein the titanium compound (3) has organosiloxy radicals attached to the titanium atom through Ti-O-Si linkages, wherein each organic radical is a monovalent hydrocarbon radical and any remaining valences of the titanium atom are satisfied by organic radicals which are attached to the titanium atom through Ti-O-C linkages.

17. A composition of matter according to claim 16 wherein $x$ is 1.

18. A composition of matter, stable under anhydrous conditions and curable by exposure to moisture, being mixed in the absence of moisture consisting essentially of (1) a hydroxylated siloxane having a viscosity of at least 25 cs. at 25° C. of the formula

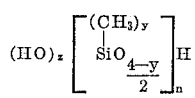

in which $z$ has an average value from 1 to 1.01 inclusive, $y$ has an average value from 1.99 to 2 inclusive, the sum of $z+y$ being 3, and $n$ is an integer, (2) vinyltrimethoxysilane in an amount of at least 0.5 mol of silane per mol of silicon-bonded hydroxyl radical in (1), and (3) at least 0.1 percent by weight based on the weight of (1) of

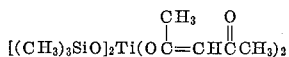

References Cited by the Examiner

UNITED STATES PATENTS

| | | | |
|---|---|---|---|
| 2,843,555 | 7/1958 | Berridge | 260—18 |
| 3,013,992 | 12/1961 | Rust et al. | 260—46.5 |
| 3,151,099 | 9/1964 | Ceyzeriat et al. | 260—46.5 |
| 3,153,000 | 10/1964 | Takimoto et al. | 260—46.5 |

FOREIGN PATENTS 962,061   6/1964   Great Britain.

LEON J. BERCOVITZ, *Primary Examiner.*

M. I. MARQUIS, *Assistant Examiner.*